US007191431B2

(12) United States Patent  (10) Patent No.: US 7,191,431 B2
Brown et al.                (45) Date of Patent:     Mar. 13, 2007

(54) SYSTEM AND METHOD FOR SELECTING A TRANSLATOR TO TRANSLATE A COMPONENT REQUEST USING SEMANTIC TYPING

(75) Inventors: Scott C. Brown, Cary, NC (US); Radhika Ramakrishnan, Durham, NC (US); Billy R. Rowe, Jr., Apex, NC (US); Edward C. Satler, Cary, NC (US); John P. Whitfield, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 10/325,687

(22) Filed: Dec. 20, 2002

(65) Prior Publication Data

US 2004/0123275 A1    Jun. 24, 2004

(51) Int. Cl.
    *G06F 9/45* (2006.01)
(52) U.S. Cl. ................. 717/136; 717/107; 717/137
(58) Field of Classification Search ........... 717/104; 709/200–219; 707/10; 715/513
    See application file for complete search history.

(56) References Cited

U.S. PATENT DOCUMENTS

| 5,872,973 | A | 2/1999 | Mitchell et al. ............ 395/685 |
| 5,956,720 | A | 9/1999 | Fernandez et al. ............ 707/10 |
| 6,044,217 | A | 3/2000 | Brealey et al. ............ 395/701 |
| 6,134,559 | A | 10/2000 | Brumme et al. ............ 707/103 |
| 6,182,277 | B1 | 1/2001 | DeGroot et al. ............. 717/1 |
| 6,199,195 | B1 | 3/2001 | Goodwin et al. ............ 717/1 |
| 6,209,124 | B1 | 3/2001 | Vermeire et al. ............ 717/1 |
| 6,643,652 | B2* | 11/2003 | Helgeson et al. ............ 707/10 |
| 2002/0032803 | A1 | 3/2002 | Marcos et al. ............ 709/315 |
| 2002/0100014 | A1* | 7/2002 | Iborra et al. ............... 717/104 |
| 2002/0161859 | A1* | 10/2002 | Willcox et al. ............ 709/219 |
| 2003/0233397 | A1* | 12/2003 | Katz et al. ................. 709/200 |
| 2004/0015537 | A1* | 1/2004 | Doerksen et al. ............ 709/203 |
| 2004/0243931 | A1* | 12/2004 | Stevens et al. ............. 715/513 |

FOREIGN PATENT DOCUMENTS

WO    WO 99/45464    9/1999

\* cited by examiner

*Primary Examiner*—Kakali Chaki
*Assistant Examiner*—Mark P. Francis
(74) *Attorney, Agent, or Firm*—Van Leevwen & Van Leeuwen; Gerald R. Woods

(57) ABSTRACT

A system and method for automatically selecting a translator to translate a component request using semantic typing is presented. A mediator receives a component request from a first component that requests to invoke a second component. The mediator retrieves a launch target identifier and a requester provided property type identifier from the component request. The requester provided property type identifier includes semantic typing corresponding to a data value. The mediator retrieves a recipient input property type identifier corresponding to the launch target identifier, and uses the requester provided property type identifier and the recipient input property type identifier to select a translator. The mediator passes a data value included in the component request to the selected translator, and receives a translated data value from the translator. The mediator constructs a property using the translated data value and includes the constructed property in a call that is sent to the second component.

28 Claims, 7 Drawing Sheets

400 ⟶

User Interface Window

```
<!ELEMENT Component (InputPropertyList?,OutputPropertyList? )>         ⟵ 402
<!ATTLIST Component
    %Name;
    %Url;>

<!ELEMENT InputPropertyList (Property+)>           ⟵ 404
<!ELEMENT OutputPropertyList (Property+)>          ⟵ 406
<!ELEMENT Property (PropertyType?, PropertyValue?)>  ⟵ 408
<!ATTLIST Property %Name; type CDATA #IMPLIED>     ⟵ 410

<!ELEMENT PropertyValue (#PCDATA)>                 ⟵ 412                   ⟵ 414
<!ATTLIST PropertyValue allocationScheme (newInstance | primitive | stringConstructor) "primitive">|

<!ELEMENT PropertyType (Encoding)>     ⟵ 416
<!ATTLIST PropertyType
    %Name;                             ⟵ 420
    type CDATA #REQUIRED>              ⟵ 422

<!ELEMENT Encoding EMPTY>              ⟵ 424
<!ATTLIST Encoding
    semanticType CDATA #REQUIRED       ⟵ 428
    domain CDATA #IMPLIED              ⟵ 430
    encoding CDATA #IMPLIED            ⟵ 432
    encodingSpec CDATA #REQUIRED>      ⟵ 434

<!ELEMENT PropertyTranslator (InputPropertyType,OutputPropertyType)>   ⟵ 436
<!ATTLIST PropertyTranslator
    %Name;                                                             ⟵ 440
    %Url;>                                                             ⟵ 442

<!ELEMENT InputPropertyType (PropertyType | PropertyName)>    ⟵ 444
<!ELEMENT OutputPropertyType (PropertyType | PropertyName)>   ⟵ 446
<!ELEMENT PropertyName (Component)>                           ⟵ 448
<!ATTLIST PropertyName
    %Name;  -- Of the property                                ⟵ 452
    inOut (input | output) #REQUIRED>                         ⟵ 454
<!ENTITY %Name "name CDATA #REQUIRED">
<!ENTITY %Url "url CDATA #REQUIRED">
```

*Figure 4*

SYSTEM AND METHOD FOR SELECTING A TRANSLATOR TO TRANSLATE A COMPONENT REQUEST USING SEMANTIC TYPING

BACKGROUND OF THE INVENTION

1. Technical Field

The present invention relates in general to a system and method for programmatic selection of a translator to translate inter-component data exchange. More particularly, the present invention relates to a system and method for building data semantics into a typing system such that translations may be automatically selected.

2. Description of the Related Art

Many computer systems today use a component-based architecture for their programming system, such as Java. Component-based architectures include a multitude of components that request information from each other and pass information to each other. Components may indirectly launch other components in situations where a first component requests information from a second component. For example, a first component wishes to request functionality from a second component but the first component includes data in XSD whereas the second component accepts data in the form of Java Objects. In this example, the two components' data may reference the same semantic object (in different formats) but they are unable to communicate until a translation bridge is provided from XML to XSD for the specific semantic object.

Over time as such component-based systems grow with additional components from different application families or business domains, the likelihood of data impedance mismatches grows dramatically. This makes it exceedingly difficult to create new solutions based on the existing components simply due to the data impedance mismatches. This is true even if the data to be exchanged between two components refers to the same or similar entities, but the data format is different.

A challenge found in component-based architectures is that "data impedance mismatches" occur when the data value format of a requesting component is different than an input data format requirement of a recipient component even if the semantics of both is the same. Component mismatches occur particularly when components are contributed and/or registered to a system from "program families" in different problem space domains over time, such as with the case of many client server platforms (e.g. Java 2 Enterprise Edition).

In systems where a mediating object launches components, the mediator does not resolve the data impedance mismatches except where trivial syntactic coercion of the data may occur. Data resolution mismatches is the responsibility of the requesting component and is usually handled using statically bound conversion routines that are programmed into the requesting component by the developer of the requesting component. The requesting component developer is required to understand the corresponding data semantic and syntax of the recipient component. This couples the requesting component to the recipient component's input format such that a change to the recipient component's input format causes the requesting component to no longer function correctly.

What is needed, therefore, is a method for semantically typing data, registering translation routines based on semantically type data, and automatically selecting a translator and using the selected translator to resolve data impedance mismatches between components.

SUMMARY

It has been discovered that the aforementioned challenges are resolved by building data semantics into a typing system such that a program is able to select translation routines to translate data from one format to another format. The translators are registered in a computer system and the translation components are selected and used at program execution.

A mediator receives a request to launch a first component, such as "Component A". The mediator constructs a first property, such as "Property X", and includes the first property in a call that is sent to the first component (i.e. component A). The first component analyzes the call and determines that a second component should be invoked. The first component constructs a second property, such as "Property Y", and includes the second property along with the second component's launch target identifier in a request that is sent to the mediator. The second property includes a data value and a property type identifier. The property type embodies the semantic meaning of the data, the units of measure of the data, and the syntactic type of the data. The mediator extracts the property type identifier from the property and will use it in the process of selecting a translator, if translation is required to match the input requirement of a recipient component.

The mediator retrieves the launch target identifier (i.e. "Launch B") which identifies a recipient component (i.e. component B). The mediator looks-up the recipient component's declaration in a nonvolatile storage area, and retrieves an input property type identifier corresponding to the recipient component's input requirements (i.e. recipient input property type identifier). Again, the property type embodies the semantic meaning of the data, the units of measure of the data, and the syntactic type of the data.

The mediator uses the first component's provided property type identifier and the recipient's input property type identifier to determine if translation is required. If the property types are the same, the property is passed in a call to the recipient component. If translation is required, then the first component's provided property type identifier and the recipient's input property type identifier are used to select a translator located in a nonvolatile storage area. The descriptive declaration of the translator externalizes that the translator can convert from the first property type to the second property type. The mediator invokes the selected translator and passes the second request's data value to the translator. The translator translates the data value and passes the translated data value back to the mediator. The mediator constructs a third property that matches the input property type of the recipient component, such as "Property Z", using the translated data value and includes the third property in a call that is sent to the recipient component for processing.

In one embodiment, the properties include a property list that corresponds to multiple properties. In this embodiment, the mediator may process each property individually.

In another embodiment, the invention may be used in web services wherein the components are decoupled and have little or no prior knowledge of the other components' input and output requirements. In this embodiment, the invention allows a programmer to write a component that combines other components and services into a larger service which eliminates data impedance mismatches by having the data translations handled by a web services server.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 4 is a user interface window that includes various declarative statements using an XML syntax;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
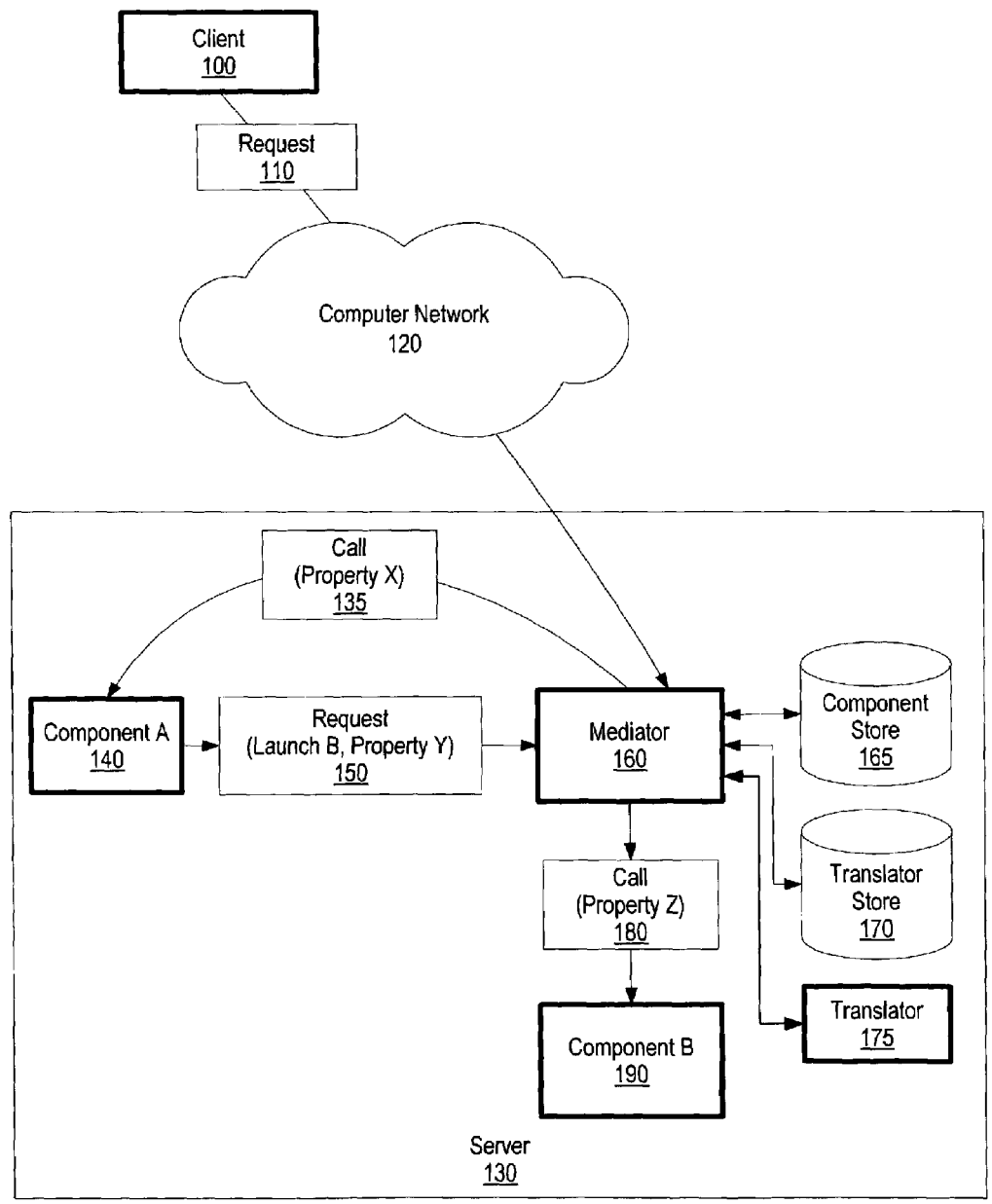
FIG. 1 is a diagram showing a server processing a client request.

FIG. 1 is a diagram showing a server processing a client request. Client 100 sends request 110 to server 130 through computer network 120, such as the Internet. Server 130 receives request 110 and invokes mediator 160 to process the request. Mediator 160 determines that component A 140 should be invoked, and sends call 135 to component A 140 which includes property X. Property X includes various attributes in which component A 140 uses. During the execution of call 135, component A 140 determines that component B 190 should be invoked. Component A 140 (i.e. the requesting component) sends request 150 to mediator 160. Request 150 includes a launch target identifier (e.g. "Launch B") and a property (e.g. "Property Y"). The launch target identifier and the property, coupled with an input specification of component B 190, enables mediator 160 to determine if translation is required. If translation is required, mediator 160 identifies a translator in translator store 170 (see FIG. 3A and corresponding text for further details regarding component request attributes).

Mediator 160 receives request 150 and extracts a requester provided property type identifier from the property included in request 150. The requester provided property type identifier includes semantic information corresponding to a data value which is also included in the property (see FIG. 3A and corresponding text for further details regarding property attributes). Processing extracts the launch target identifier (i.e. "Launch B") to identify a recipient component located in component store 165. The declaration of Component B contains information about the input property of Component B, which includes its input property type identifier.

The requester provided property type may not match the recipient's input property type, in which case a translation of data value from the provided property type to the required property type is needed. The recipient input property includes a recipient input property type identifier which is used, along with the requester provided property type identifier, to select a translator located in translator store 170 (see FIG. 6 and corresponding text for further details regarding translator selection). Component store 165 and translator store 170 may be stored on a non-volatile storage area, such as a computer hard drive.

Mediator 160 invokes the selected translator, such as translator 175, and passes a data value that mediator 160 extracted from the property (i.e. property Y) that is included in request 150. Translator 175 translates the data value, and returns the translated data value to mediator 160. Mediator 160 receives the translated data value, and constructs a property (i.e. "Property Z") using the translated data value and component B 190's recipient input property type. Mediator includes the constructed property in call 180, and sends call 180 to component B 190 for processing.

In one embodiment, mediator 160 and component B 190 may be on different servers than component A 140. In this embodiment, information exchange between component A 140, mediator 160, and component B 190 may be over a computer network, such as a LAN or the Internet.

Figure 2A:
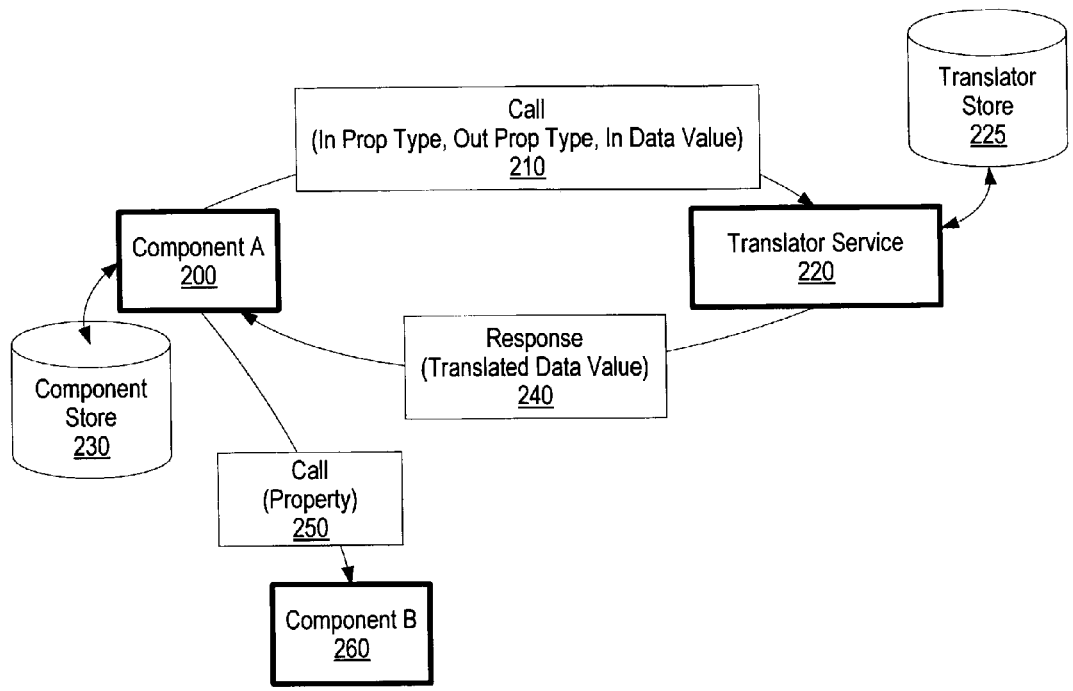
FIG. 2A is a diagram showing a first component using a translator service to translate semantically typed data supplied by the first component into a data format corresponding to a semantically typed input of a second component.

FIG. 2A is a diagram showing a first component using a translator service to translate semantically typed data of a first component into a data format corresponding to a semantically typed input of a second component. Component A 200 wishes to send a call to component B 260 and looks-up a recipient input property type identifier corresponding to component B 260 in component store 230. The recipient input property type identifier corresponds to component B 260's input property (see FIG. 5 and corresponding text for further details regarding recipient input property type identifiers).

Component A 200 identifies a recipient input property type identifier corresponding to component B 260 and creates call 210 that includes two property types and an object input value to be translated (e.g., a data value). One of the property types included in the call identifies the property type from which to translate (e.g., property type of component A 200's data value). The other property type included in the call identifies the property type to which translation will be performed (e.g. component B 260's recipient input property type identifier).

Component A 200 sends call 210 to translator service 220. Translator service 220 receives call 210, and looks-up a translator in translator store 225 using the requester provided property type identifier and the recipient input property type identifier (see FIG. 6 and corresponding text for further details regarding translator selection). Translator store 225 may be stored on a non-volatile storage area, such as a computer hard drive.

Translator service 220 translates the data value using the selected translator, and sends response 240 to component A 200 which includes the translated data value. Component A 200 receives response 240, and constructs a property using the translated data value and component B 260's recipient input property type. Component A 200 includes the constructed property in call 250, and sends call 250 to component B 260 for processing.

Figure 2B:
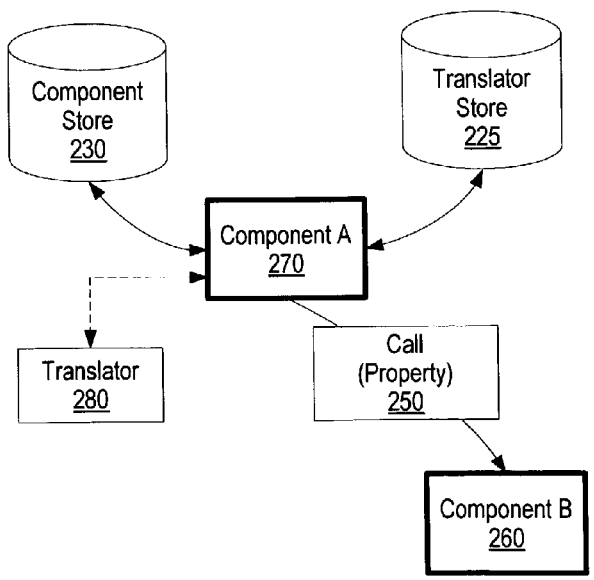
FIG. 2B is a diagram showing a first component identifying a translator, translating a request using the translator, and calling a second component using the translated request.

FIG. 2B is a diagram showing a first component identifying a translator, translating a request using the translator, and calling a second component using the translated request. Component A 270 wishes to send a call to component B 260 and looks-up component B 260's input property in component store 230. The recipient input property defines the recipient's input property type (see FIG. 5 and corresponding text for further details regarding recipient input property type identifiers) Component store 230 may be stored on a non-volatile storage area, such as a computer hard drive.

Figure 6:
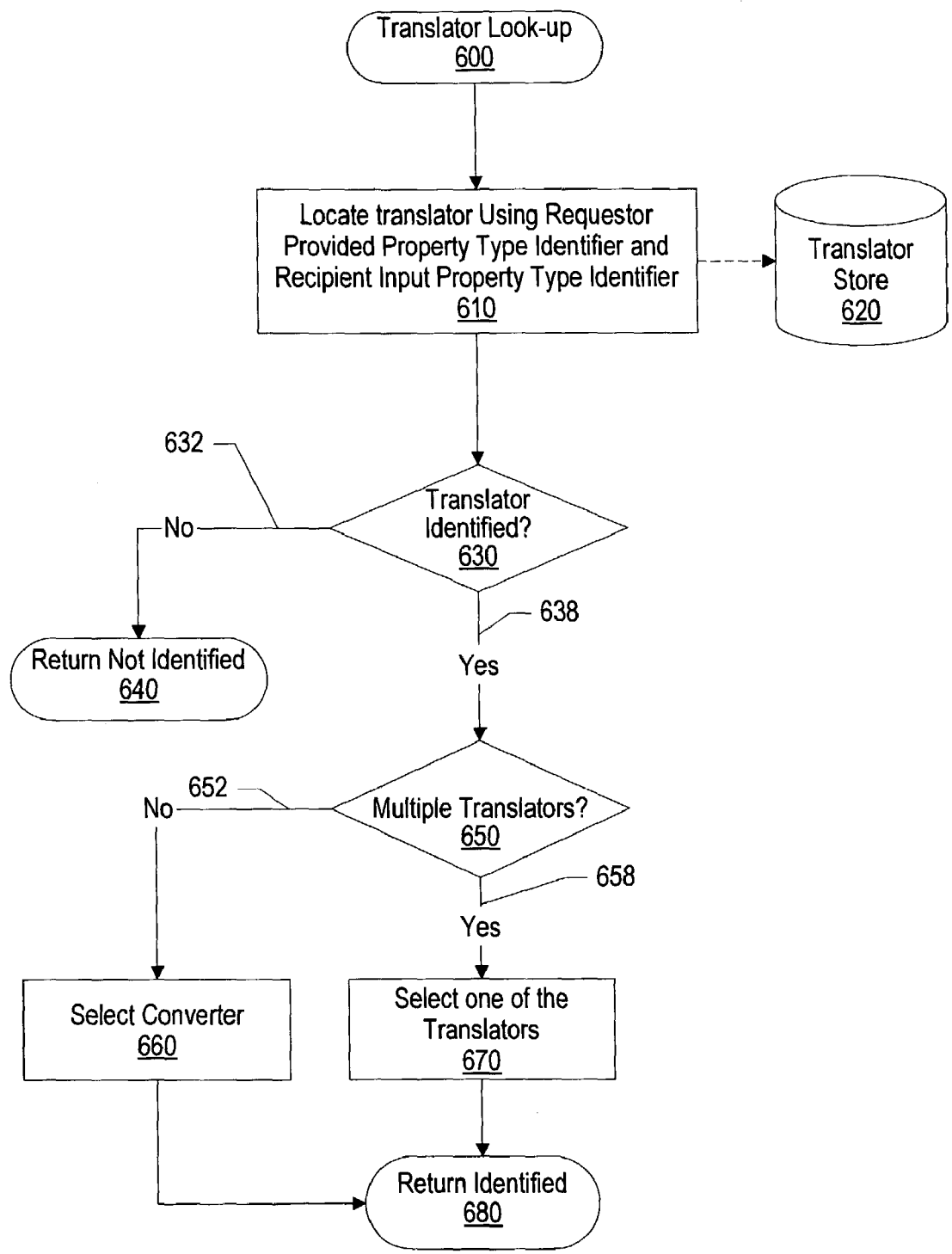
FIG. 6 is a flowchart showing steps taken in identifying a translator to translate a component request.

Component A 270 identifies a recipient input property type identifier corresponding to component B 260, and selects a translator located in translator store 225 using component B 260's recipient input property type identifier and an internally known property type of component A 270 (see FIG. 6 and corresponding text for further details regarding translator selection). Translator store 225 may be stored on a non-volatile storage area, such as a computer hard drive.

Component A 270 translates a data value using the selected translator, such as translator 280, and constructs a property using the translated data value and component B 260's recipient input property type. Component A 270 includes the constructed property in call 250, and sends call 250 to component B 260 for processing.

Figure 3A:
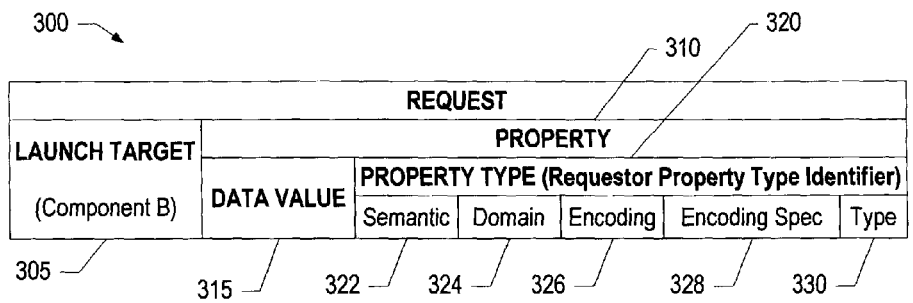
FIG. 3A is a structural representation of a component request showing various sections of the component request.

FIG. 3A is a structural representation of a component request, such as component request 300, showing various sections of the component request. Component request 300 includes launch target 305 and property 310. Launch target 305 includes a launch target identifier (i.e. launch interface identifier for the recipient component) corresponding to a component that property 310 should be sent. The example in FIG. 3A shows launch target 305 includes a launch target identifier "Component B". A mediator uses the launch target identifier to identify the recipient component's input property and uses the recipient component's input property to identify the recipient component's input property type identifier (not shown in FIG. 3A).

Figure 5:
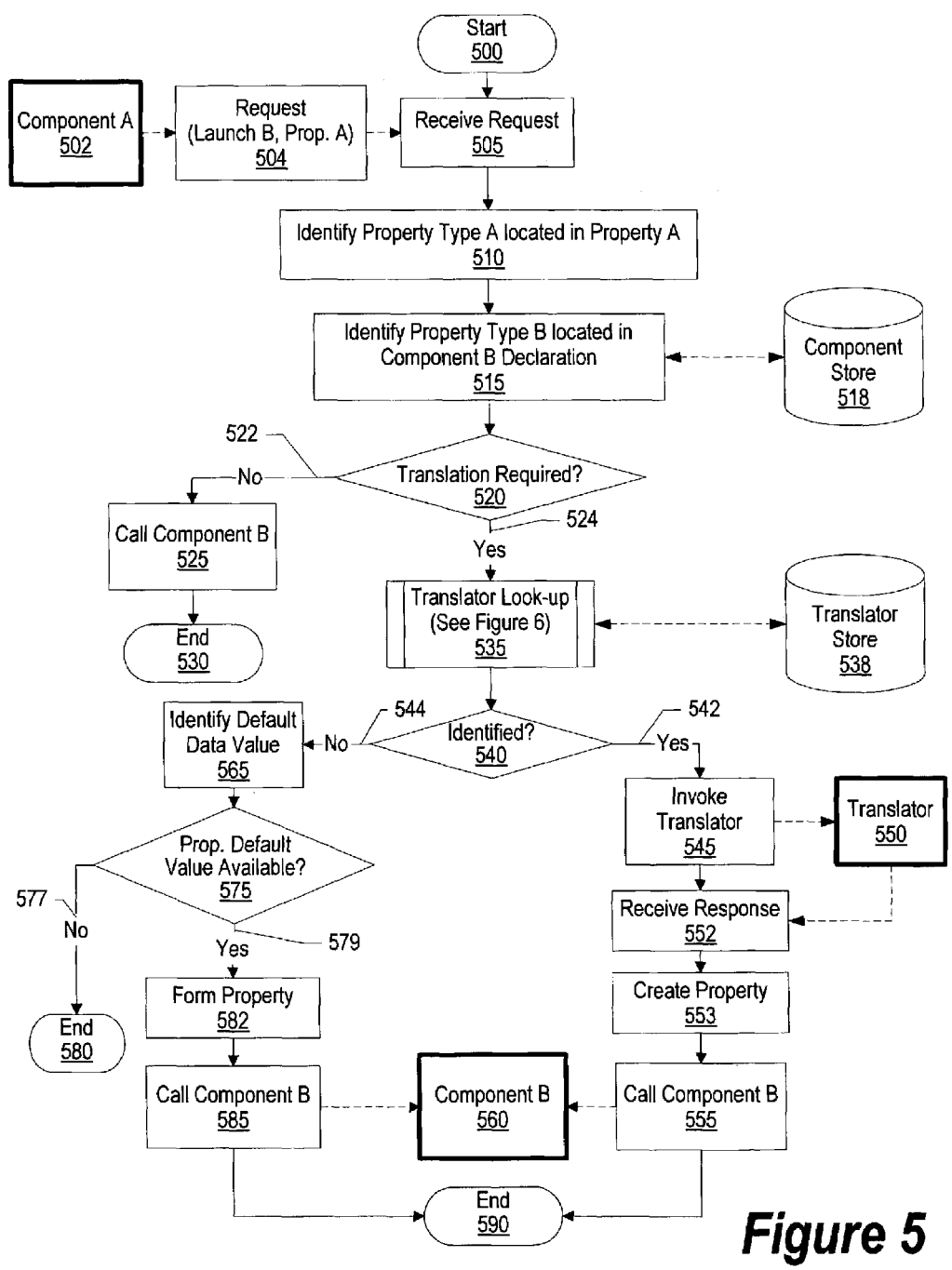
FIG. 5 is a flow chart showing steps taken in translating a request received from a first component and launching a second component using the translated request.

Property 310 includes data value 315 which includes a data value that may be translated by a translator (see FIGS. 1, 5, 6, and corresponding text for further details regarding data value translation). Property 310 also includes property type 320 which includes semantic typing and units of measure for data value 315 (see FIGS. 1, 5, 6, and corresponding text for further details regarding requester provided property type identifier use).

Property type 320 includes semantic 322, domain 324, encoding 326, encoding specification 328, and type 330. Semantic 322 includes a classification of property 310, such as "hostname". Domain 324 is a next higher level of classification, such as product family (e.g. "TME"). Encoding 326 includes an encoding type of property 320, such as "Java". For example, encoding 326 may be thought of as the typing language the data is defined in. Encoding specification 328 includes a specification corresponding to encoding 326. Encoding specification 328 provides the minimal typing that the data must have. One intended use of encoding specification 328 is for declaring units of measure. For example, if encoding 326 is "XSD", then encoding specification 328 includes an XSD schema description. Another example is if encoding 326 is "Java", then encoding specification 328 may be either a Java class or a Java interface that the data value 315 must derive from or implement respectively. Type 330 includes an actual type of data value 315. The actual type may be the same as encoding specification 328. If type 330 is different than encoding specification 328, then type 330 also embodies encoding specification 328. For example, if encoding 326 is "Java", encoding specification 328 is "InterfaceI", and type 330 is "ClassJ", then "ClassJ" implements "InterfaceI".

Figure 3B:
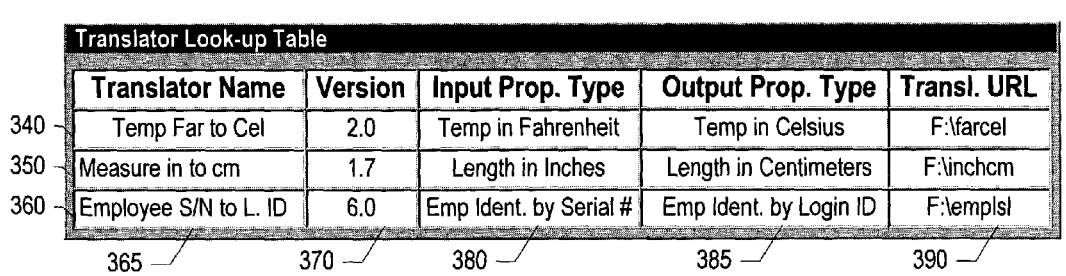
FIG. 3B is a translator look-up table showing various translators and their corresponding attributes.

FIG. 3B is a translator look-up table, such as look-up table 335, showing various translators and their corresponding declarative attributes. A mediator uses look-up table 335 to locate a translator to translate a data value in a component request. Look-up table 335 includes five columns which are translator name column 365, version column 370, input property type column 380, output property type column 385, and translator URL column 390.

Translator name column 365 includes names of translators that are available to translate component requests. Line 340 includes translator name "Temperature Fahrenheit to Celsius" and the corresponding translator may be used to translate a component request's data value that is in semantic "Temperature" and units of measure "Fahrenheit" to semantic "Temperature" and units of measure "Celsius". Line 350 includes translator name "Measure Inches to Centimeters" and the corresponding translator may be used to translate a component request's data value that is in semantic "Length" and units of measure "inches" to semantic "Length" and units of measure "centimeters". Line 360 includes translator name "Employee serial number to login id" and the corresponding translator may be used to translate a component request's data value that is in semantic "Employee" and units of measure "employee serial number" to a semantic of "Authentication" and a unit of measure ""employee login id".

Version column 370 includes version numbers corresponding to translator names located in translator name column 365. Processing may use version numbers to select a translator. For example, look-up table may include three translators, each with the name "Temperature Fahrenheit to Celsius". In this example, processing select the translator with the highest version number for its translation process (see FIG. 6 and corresponding text for further details regarding translator selection).

Input property type column 380 includes input property type identifiers corresponding to each particular translator. Processing matches input property type identifiers with requester provided property type identifiers in the process of identifying translators corresponding to a particular request. Output property type column 385 includes output property type identifiers corresponding to each particular translator. Processing matches output property type identifiers with recipient input property type identifiers in the process of identifying suitable translators corresponding to a particular request. The suitable translators translate from the input property type to the output property type. Translator URL column 390 includes locations of corresponding translators. When processing selects a translator, processing uses the location information to invoke the selected translator.

FIG. 4 is a user interface window, such as window 400, that includes various XML declarative statements. As one skilled in the art can appreciate, the declarative statements may be written in syntax other than XML. Line 402 includes a component element that describes basic information about a software component, such as its input properties (inputpropertylist) and output properties (outputpropertylist).

Line 404 includes an input property list element which provides a mechanism to aggregate multiple input properties into a single collection. Line 406 includes an output property list element which provides a mechanism to aggregate multiple output properties into a single collection. Line 408 includes a property element which describes a mechanism in which data is typed, inclusive of syntactic and semantic typing (property type), the value and an optional default value (property value). Line 410 includes the property's name (% name) and an alternative method to type a property that does not include semantics (type) which may be used to retrofit existing systems that do not include semantic information.

Line 412 includes a property value element which describes a value that is passed to components (#PCDATA). Line 414 includes an optional mechanism to synthesize a default value (allocationscheme) from a property value element of a property. The allocation scheme allows for the default value to be provided as a primitive value (e.g. integer), by executing the default constructor of a Java class (newInstance), or by passing a string into a Java Class constructor that accepts a single String input (stringConstructor).

Line 416 includes a property type element which describes a semantic encoding of a property as well as its syntactic typing. In essence, it forms a new typing system where semantic types and syntactic types are merged. Line 420 includes a name (% name) which declares the name corresponding to the property type (i.e. a property type identifier). Line 422 includes a type which is scoped to the encoding and is dependent upon the encoding specification and is the actual type of the data value. (see below).

Line 424 includes an encoding element that describes a semantic encoding which allows a merger of syntactic type with semantic type to form a new typing system. Line 428 includes a semantic classification of the property, such as "hostname". Line 430 includes a domain field which may include a higher level of classification, such as a product family (e.g. "TME"). Line 432 includes an encoding type, such as "Java", which is the implementation language of the data value. Line 434 includes an encoding specification that is dependent upon the encoding and provides the minimal typing the data value must have. For example, if the encoding is "XSD", then the encoding specification includes an XSD schema description.

Line 436 includes a property translator element which describes a software entity that translates between two different property types. "Inputpropertytype" is the input type specification for the translator and "Outputpropertytype" is the output type specification for the translator. Line 440 includes a name (% name) which describes a name corresponding to the translator (i.e. a translator name). Line 442 includes a location corresponding to the translator.

Line 444 includes an input property type element which describes a property's type that is input to the translator. Line 446 includes an output property type element which describes an output property's type of the translator. Line 448 includes a property name element which describes a reference to a specific property on a specific component (component). The property name allows processing to uniquely identify a specific input or output of a specific component which may be useful in retrofitting systems that do not specify property types. Line 452 includes a name (% name) of the property name. Line 454 includes information which designates whether the property name is an input or output property.

FIG. 5 is a flow chart showing steps taken in translating a request received from a first component, such as component A 502, and launching a second component, such as component B 560, using the translated request. Processing commences at 500, whereupon processing receives request 504 from component A 502 (step 505). Request 504 includes a launch target identifier, such as "Launch B", and a property, such as Property A". The launch target identifier corresponds to a recipient component, such as component B 560, for Property A in request 504. The property includes a requester provided property type identifier and a data value. The requester provided property type identifier includes a semantic that corresponds to the "meaning" of the data value. For example, the requester provided property type identifier may be "Celsius", the semantic may be "Temperature", and the data value may be "10" (see FIG. 3A and corresponding text for further details regarding component request attributes).

Processing extracts the requester provided property type identifier from request 504 at step 510. Processing extracts the launch target identifier (i.e. "Launch B") from request 504 and uses it to identify a recipient component in component store 518 (step 515). From the recipient component declaration, processing extracts the input property. Component store 518 may be stored on a non-volatile storage area, such as a computer hard drive. The recipient input property includes a recipient input property type identifier and may include a default data value. The recipient input property type identifier provides semantics, units of measure, and the default data value. The recipient input property type identifier and the requestor provided property type identifier will be used to select a translator if translation is required. A default data value may be used if translation is necessary and a translator cannot be located or a data value was not supplied for input to the recipient component.

A determination is made as to whether a translation is required by comparing the requester provided property type identifier with the recipient input property type identifier (decision 520). For example, if the requester provided property type identifier is "Celsius" and the recipient input property type identifier is "Celsius", then processing is not required to translate the request.

If processing determines that translating the component request is not required, decision 520 branches to "No" branch 522 whereupon processing calls component B using the property supplied in request 504 (step 525), and processing ends at 530.

On the other hand, if processing determines that translating the request is required, decision 520 branches to "Yes" branch 524 whereupon processing looks-up and selects a translator from translator store 538 (see FIG. 6 and corresponding text for further details regarding translator look-up and selection steps) Translator store 538 may be stored on a non-volatile storage area, such as a computer hard drive.

A determination is made as to whether a suitable translator was located in translator store 538 (decision 540). If processing identified a translator, decision 540 branches to "Yes" branch 542 whereupon processing invokes the translator, such as translator 550, and passes the data value from request 504 (step 545). The declarative description of the translator provides the input property type and the output property type. Processing receives a translated data value from translator 550 at step 552, and creates a property using the translated data value at step 553 and the recipient's input property type (515). Processing calls component B 560 (i.e. the recipient component) and passes the created property to component B 560 at step 555, and processing ends at 590.

On the other hand, if processing did not identify a suitable translator, decision 540 branches to "No" branch 540 whereupon processing identifies whether a default data value was included in the retrieved recipient input property (see step 515) at step 565. A determination is made as to whether a default data value is available (decision 575). If a default data value is not available, decision 575 branches to "No" branch 577 whereupon processing ends at 580. On the other hand, if a default data value is available, decision 575 branches to "Yes" branch 579 whereupon processing creates a property using the default data value (step 582). Processing calls component B 560 using the created property at step 585, and processing ends at 590.

FIG. 6 is a flowchart showing steps taken in identifying a translator to translate a component request. Processing commences at 600, whereupon processing uses a requester provided property type identifier and a recipient input property type identifier to look-up one or more translators located in translator store 620. Processing previously extracted the requester provided property type identifier from a component request and identified the recipient input property type identifier from the recipient component (see FIG. 5 and corresponding text for further details). Translator store 620 may be stored on a non-volatile storage area, such as a computer hard drive.

In one embodiment, processing may perform complex processing to determine if it is able to perform a translation if multiple translators are invoked in series. For example, processing may invoke a first translator (i.e. initial translator) to translate from property type A to property type C and then invoke a second translator (i.e. subsequent translator) to translate from property type C to property type B in order to perform an overall translation from property type A to property type B. Such a series of translators will be treated and referred to synonymously as a single translator.

A determination is made as to whether processing identified one or more translators in translator store 620 (step 630). If processing did not identify one or more translators, decision 630 branches "No" branch 632 whereupon processing returns "not identified" at 640.

On the other hand, if processing identified one or more translators in translator store 620, processing branches to "Yes" branch 638 whereupon a determination is made as to whether processing identified multiple translators for the same translation need. For example, processing may identify four translators that correspond to the requester provided property type identifier and the recipient input property type identifier. In this example, the four translators may have the same translator name but with different version numbers.

If processing did not identify multiple suitable translators for the same translation process in translator store 620, decision 650 branches to "No" branch 652 whereupon processing selects the identified translator at step 660, and returns at 680. On the other hand, if processing identified multiple translators in translator store 620, processing branches to "Yes" branch 658 whereupon processing selects one of the translators at step 670. In one embodiment, processing selects one of the translators by identifying which translator corresponds to a most recent version number. In another embodiment, processing selects a most suitable translator by identifying which translator was most recently input to the computer system. For example, each translator may have a different name and matching a version number to each translator is immaterial. In this example, processing identifies which translator was most recently input to the computer system. Processing returns at 680.

In one embodiment, processing may perform other types of translations. For example, the property types that are compared may have the same semantics but with different types. For example, a property of semantic HOST is of type URL, where as the other property is of semantic HOST but of type TME OID. Another example is if the semantic is different such as if a first property is of semantic TME USER and a second property is of semantic TBSM USER. In this example, the translation is performed from one semantic to the other. In yet another example with an existing system, a "Property Name" is used to identify the properties for translation and the translators may be specified to translate from/to a "Property Type" or a "Property Name". This mechanism facilitates retrofitting existing systems that do not use property types exclusively.

Figure 7:
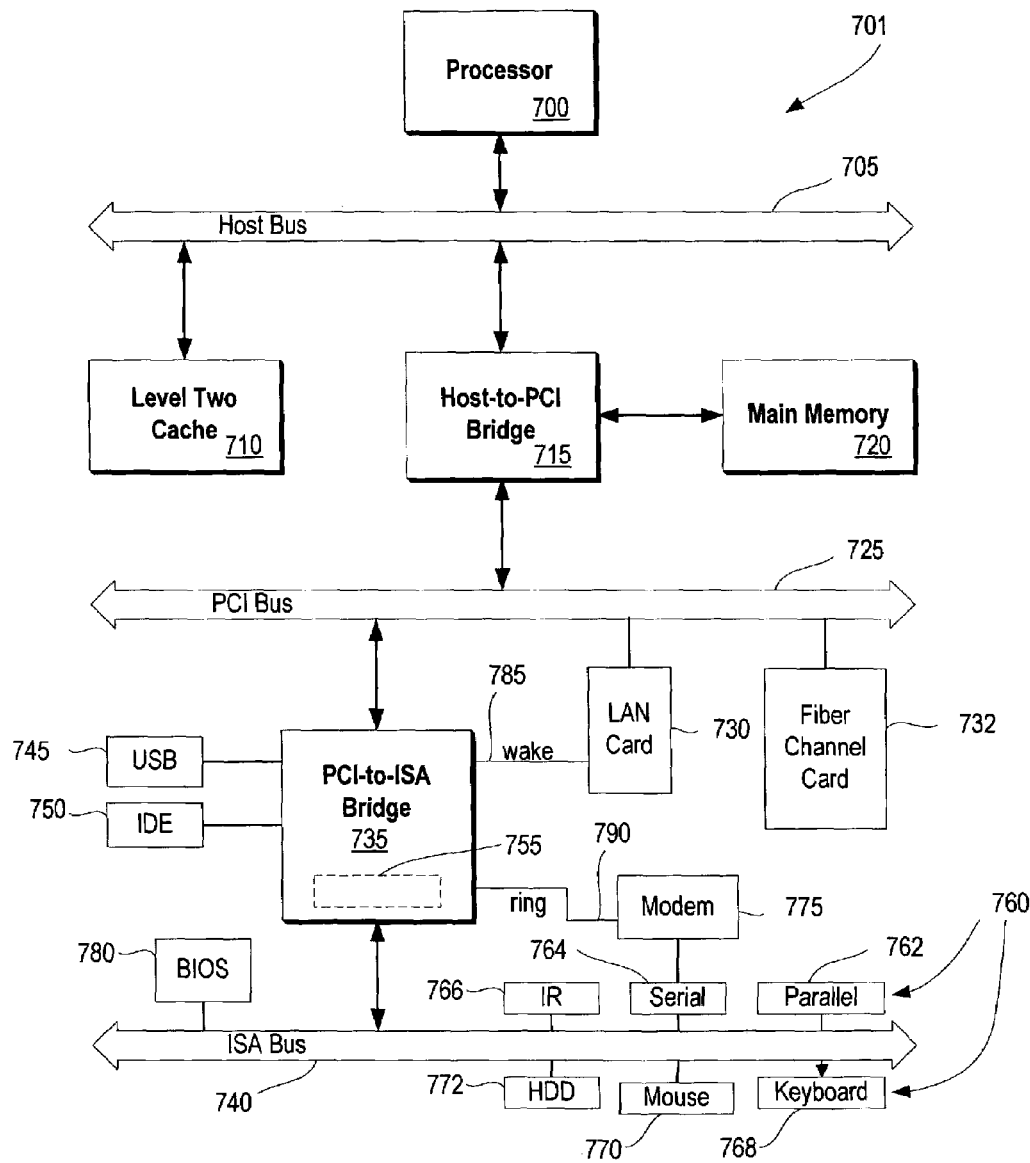
FIG. 7 is a block diagram of an information handling system capable of implementing the present invention.

FIG. 7 illustrates information handling system 701 which is a simplified example of a computer system capable of performing the invention described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method of translating a computer-based component request, said method comprising:
   receiving the component request, wherein the component request includes a requestor provided property type identifier and a launch target identifier;
   retrieving a recipient input property type identifier, wherein the recipient input property type identifier corresponds to the launch target identifier;
   determining that a translator exists that is adapted to translate a data value included in the component request from a format corresponding to the requestor provided property type identifier directly to a format corresponding to the recipient input property type identifier;
   selecting the translator in response to the determination; and
   translating the data value from the format corresponding to the requestor provided property type identifier directly to the format corresponding to the recipient input property type identifier using the selected translator.

2. The computer-implemented method as described in claim 1 further comprising:
   identifying a recipient component that corresponds to the launch target identifier; and
   sending the translated component request to the recipient component.

3. The computer-implemented method as described in claim 1 wherein the requestor provided property type identifier and the recipient input property type identifier include semantic typing corresponding to the data value.

4. The computer-implemented method as described in claim 1 further comprising:
   dynamically registering the translator prior to receiving the component request, wherein the selecting is performed at program execution.

5. The computer-implemented method as described in claim 1 further comprising:
   identifying a default data value in response to determining that a translator does not exist corresponding to the requestor provided property type identifier and the recipient input property type identifier, the default data value corresponding to a recipient component that corresponds to the launch target identifier; and
   sending the identified default data value to the recipient component.

6. The computer-implemented method as described in claim 1 wherein the selecting further comprises:
   identifying the translator from a plurality of suitable translators.

7. The computer-implemented method as described in claim 1 further comprising:
   determining that the requestor provided property type identifier and the recipient input property type identifier are the same; and
   not performing the selecting and the translating based upon determining that the requestor provided property type identifier and the recipient input property type identifier are the same.

8. The computer-implemented method as described in claim 1 wherein the translating is performed on a translator system, and wherein the translator system is selected from the group consisting of a requesting component, a mediator, and a translator service.

9. The computer-implemented method as described in claim 1 wherein the selecting further comprises:
   identifying one or more translators from a plurality of translators;
   retrieving a version identifier for each of the identified translators, wherein the retrieving results in a plurality of version identifiers;
   determining a most recent version identifier from the plurality of retrieved version identifiers; and
   selecting the translator corresponding to the most recent version identifier.

10. An information handling system comprising:
    one or more processors;
    a memory accessible by the processors;
    one or more nonvolatile storage devices accessible by the processors; and
    a translation tool to translate a computer-based component request, the translation tool including:
       receiving logic for receiving the component request, wherein the component request includes a requestor provided property type identifier and a launch target identifier;
       retrieving logic for retrieving a recipient input property type identifier from one of the nonvolatile storage devices, wherein the recipient input property type identifier corresponds to the launch target identifier;
       determination logic for determining that a translator exists that is adapted to translate a data value included in the component request from a format corresponding to the requestor provided property type identifier directly to a format corresponding to the recipient input property type identifier;
       selection logic for selecting the translator in response to the determination; and
       translation logic for translating the data value from the format corresponding to the requestor provided property type identifier directly to the format corresponding to the recipient input property type identifier using the selected translator.

11. The information handling system as described in claim 10 further comprising:
   identification logic for identifying a recipient component that corresponds to the launch target identifier; and
   transmission logic for sending the translated request to the recipient component.

12. The information handling system as described in claim 10 wherein the requestor provided property type identifier and the recipient input property type identifier include syntactic typing corresponding to the data value.

13. The information handling system as described in claim 10 further comprising:
   registration logic for dynamically registering the translator prior to receiving the component request,
   wherein the selection logic is performed at program execution.

14. The information handling system as described in claim 10 further comprising:
   identification logic for identifying a default data value in response to determining that a translator does not exist corresponding to the requestor provided property type identifier and the recipient input property type identifier, the default data value corresponding to a recipient component that corresponds to the launch target identifier; and
   transmission logic for sending the identified default data value to the recipient component.

15. The information handling system as described in claim 10 wherein the selecting further comprises:
   identification logic for identifying one or more translators from a plurality of translators located in one of the nonvolatile storage devices;
   retrieval logic for retrieving a version identifier for each of the identified translators from one of the nonvolatile storage devices, wherein the retrieving results in a plurality of version identifiers;
   determination logic for determining a most recent version identifier from the plurality of retrieved version identifiers; and
   selection logic for selecting the translator corresponding to the most recent version identifier.

16. A computer program product stored on a computer readable storage media for performing computer-based request translations, said computer program product comprising:
   Means for receiving the component request, wherein the component request includes a requestor provided property type identifier and a launch target identifier;
   Means for retrieving a recipient input property type identifier, wherein the recipient input property type identifier, corresponds to the launch target identifier;
   Means for determining that a translator exists that is adapted to translate a data value included in the component request from a format corresponding to the requestor provided property type identifier directly to a format corresponding to the recipient input property type identifier:
   Means for selecting the translator in response to the determination; and
   Means for translating the data value from the format corresponding to the requestor provided property type identifier directly to the format corresponding to the recipient input property type identifier using the selected translator.

17. The computer program product as described in claim 16 further comprising:
   means for identifying a recipient component that corresponds to the launch target identifier; and
   means for sending the translated component request to the recipient component.

18. The computer program product as described in claim 16 wherein the requestor provided property type identifier and the recipient input property type identifier include semantic typing corresponding to the data value.

19. The computer program product as described in claim 16 further comprising:
   means for dynamically registering the translator prior to receiving the component request, wherein the selecting is performed at program execution.

20. The computer program product as described in claim 16 further comprising:
   means for identifying a default data value in response to the means for determining that a translator does not exist corresponding to the requestor provided property type identifier and the recipient input property type identifier, the default data value corresponding to a recipient component that corresponds to the launch target identifier; and
   means for sending the identified default data value to the recipient component.

21. The computer program product as described in claim 16 wherein the selecting further comprises:
   means for identifying the translator from a plurality of suitable translators.

22. The computer program product as described in claim 16 further comprising:
   means for determining that the requestor provided property type identifier and the recipient input property type identifier are the same; and
   means for not performing the selecting and the translating based upon determining that the requestor provided property type identifier and the recipient input property type identifier are the same.

23. The computer program product as described in claim 16 wherein the means for translating is performed on a translator system, and wherein the translator system is selected from the group consisting of a requesting component, a mediator, and a translator service.

24. The computer program product as described in claim 16 wherein the means for selecting further comprises:
   means for identifying one or more translators from a plurality of translators;
   means for retrieving a version identifier for each of the identified translators, wherein the retrieving results in a plurality of version identifiers;
   means for determining a most recent version identifier from the plurality of retrieved version identifiers; and
   means for selecting the translator corresponding to the most recent version identifier.

25. A computer-implemented method of translating a computer-based component request, said method comprising:
   receiving the component request, wherein the component request includes a requestor provided property type identifier and a launch target identifier;
   retrieving a recipient input property type identifier, wherein the recipient input property type identifier corresponds to the launch target identifier;
   determining that a translator exists that is adapted to translate a data value included in the component request from a format corresponding to the requestor provided property type identifier directly to a format corresponding to the recipient input property type identifier;

selecting the translator based upon the determination;

translating the data value from the format corresponding to the requestor provided property type identifier directly to the format corresponding to the recipient input property type identifier using the selected translator;

identifying a recipient component that corresponds to the launch target identifier; and sending the translated data value to the recipient component.

26. A computer-implemented method of translating a computer-based component request, said method comprising:

receiving the component request, wherein the component request includes a requestor provided property type identifier and a launch target identifier;

retrieving a recipient input property type identifier, wherein the recipient input property type identifier corresponds to the launch target identifier;

determining that a translator exists that is adapted to translate a data value included in the component request from a format corresponding to the requestor provided property type identifier directly to a format corresponding to the recipient input property type identifier;

selecting the translator based upon the determination, wherein the selecting further comprises:

identifying one or more translators from the plurality of translators;

retrieving a version identifier for each of the identified translators, wherein the retrieving results in a plurality of version identifiers;

determining a most recent version identifier from the plurality of retrieved version identifiers; and selecting the translator corresponding to the most recent version identifier; and translating the data value from the format corresponding to the requestor provided property type identifier directly to the format corresponding to the recipient input property type identifier using the selected translator.

27. An information handling system comprising:

one or more processors;

a memory accessible by the processors;

one or more nonvolatile storage devices accessible by the processors; and a translation tool to translate a computer-based component request, the translation tool including:

receiving logic for receiving the component request, wherein the component request includes a requestor provided property type identifier and a launch target identifier;

retrieving logic for retrieving a recipient input property type identifier from one of the nonvolatile storage devices, wherein the recipient input property type identifier corresponds to the launch target identifier;

determination logic for determining that a translator exists that is adapted to translate a data value included in the component request from a format corresponding to the requestor provided property type identifier directly to a format corresponding to the recipient input property type identifier;

selection logic for selecting the translator based upon the determination;

translation logic for translating the data value from the format corresponding to the requestor provided property type identifier directly to the format corresponding to the recipient input property type identifier using the selected translator;

identification logic for identifying a recipient component that corresponds to the launch target identifier; and transmission logic for sending the translated data value to the recipient component.

28. A computer program product stored on a computer readable storage media for performing computer-based request translations, said computer program product comprising:

Means for receiving the component request, wherein the component request includes a requestor provided property type identifier and a launch target identifier;

Means for retrieving a recipient input property type identifier, wherein the recipient input property type identifier, corresponds to the launch target identifier;

Means for determining that a translator exists that is adapted to translate a data value included in the component request from a format corresponding to the requestor provided property type identifier directly to a format corresponding to the recipient input property type identifier:

Means for selecting the translator based upon the determination, wherein the means for selecting further includes:

Means for identifying one or more suitable translators from a plurality of translators; and means for determining the suitable translator from the identified translators; and Means for translating the data value from the format corresponding to the requestor provided property type identifier directly to the format corresponding to the recipient input property type identifier using the selected translator.

* * * * *